United States Patent [19]

Yamamoto et al.

[11] Patent Number: 5,450,233
[45] Date of Patent: Sep. 12, 1995

[54] MICROSCOPE HAVING Y-SHAPED FRAME STRUCTURE

[75] Inventors: Soji Yamamoto; Takashi Nagano, both of Tokyo, Japan

[73] Assignee: Olympus Optical Co., Ltd., Tokyo, Japan

[21] Appl. No.: 53,877

[22] Filed: Apr. 27, 1993

[30] Foreign Application Priority Data

Apr. 28, 1992 [JP] Japan .................. 4-028503 U
Feb. 3, 1993 [JP] Japan .................. 5-016521

[51] Int. Cl.6 ............................ G02B 11/22
[52] U.S. Cl. ................. 359/368; 359/372; 359/391; 359/393; 359/384; 248/346.01
[58] Field of Search ........... 359/368, 372, 391, 393, 359/384; 248/346, 431, 678, 916; 250/201.3, 234

[56] References Cited

U.S. PATENT DOCUMENTS 1,458,143  6/1923  Muller ........................ 359/368
4,299,440 11/1981  Hodgson ....................... 359/393

FOREIGN PATENT DOCUMENTS 14-6307  5/1939  Japan .

Primary Examiner—David C. Nelms
Assistant Examiner—F. Niranjan
Attorney, Agent, or Firm—Frishauf, Holtz, Goodman, Langer & Chick

[57] ABSTRACT

A microscope includes an observation optical system having at least an optical axis, an eyepiece unit, and an objective lens unit, and a frame for arranging the observation optical system thereon. The frame has a Y-shaped body, constituted by forming a first foot extending along the optical axis, a second foot extending along the optical axis, and a base located immediately under the optical axis to substantially form a Y shape within an installation surface, and an arm member connected to the Y-shaped body and having at least the eyepiece unit and the objective lens unit mounted thereon.

34 Claims, 11 Drawing Sheets

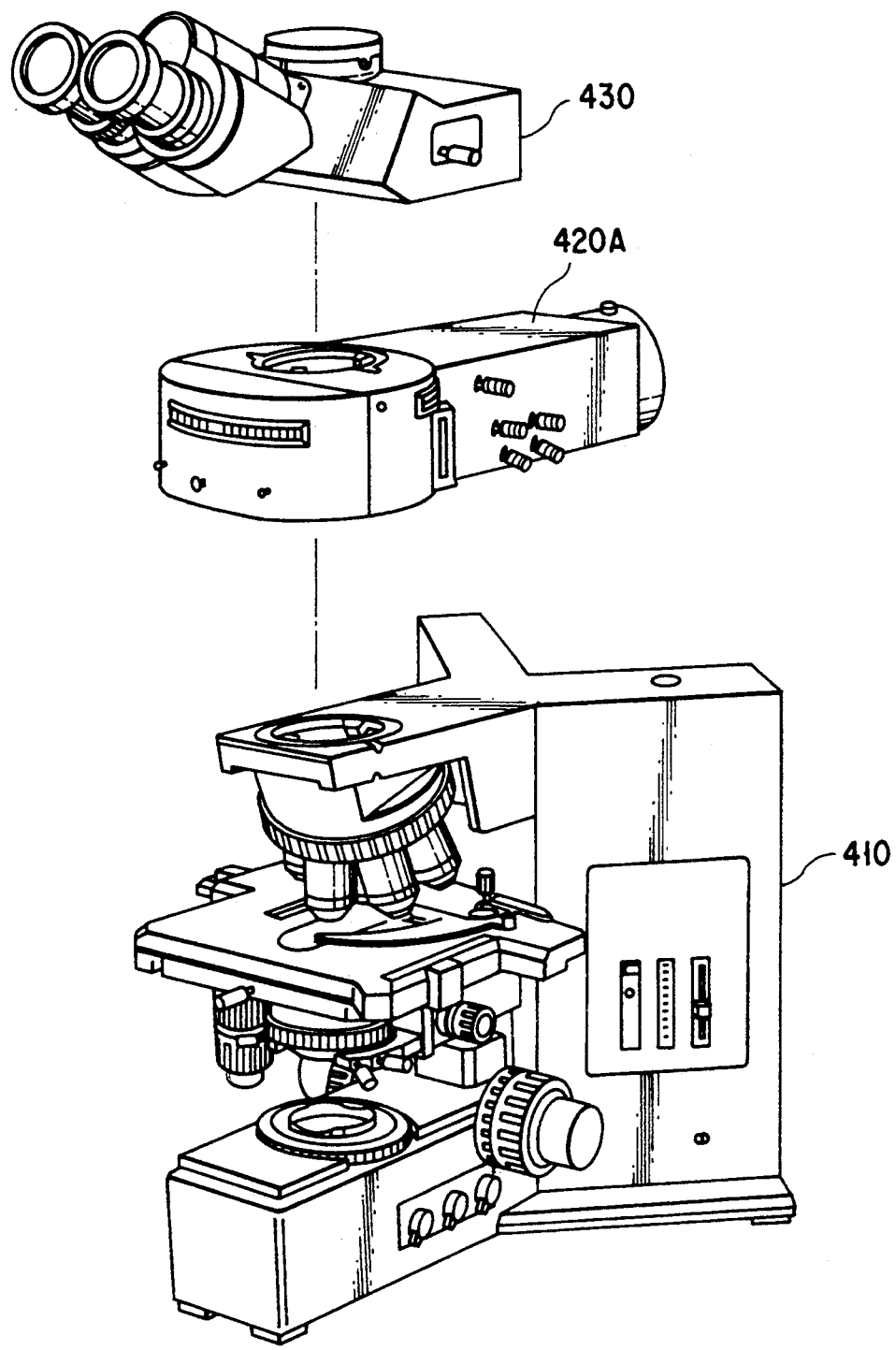
F I G. 16

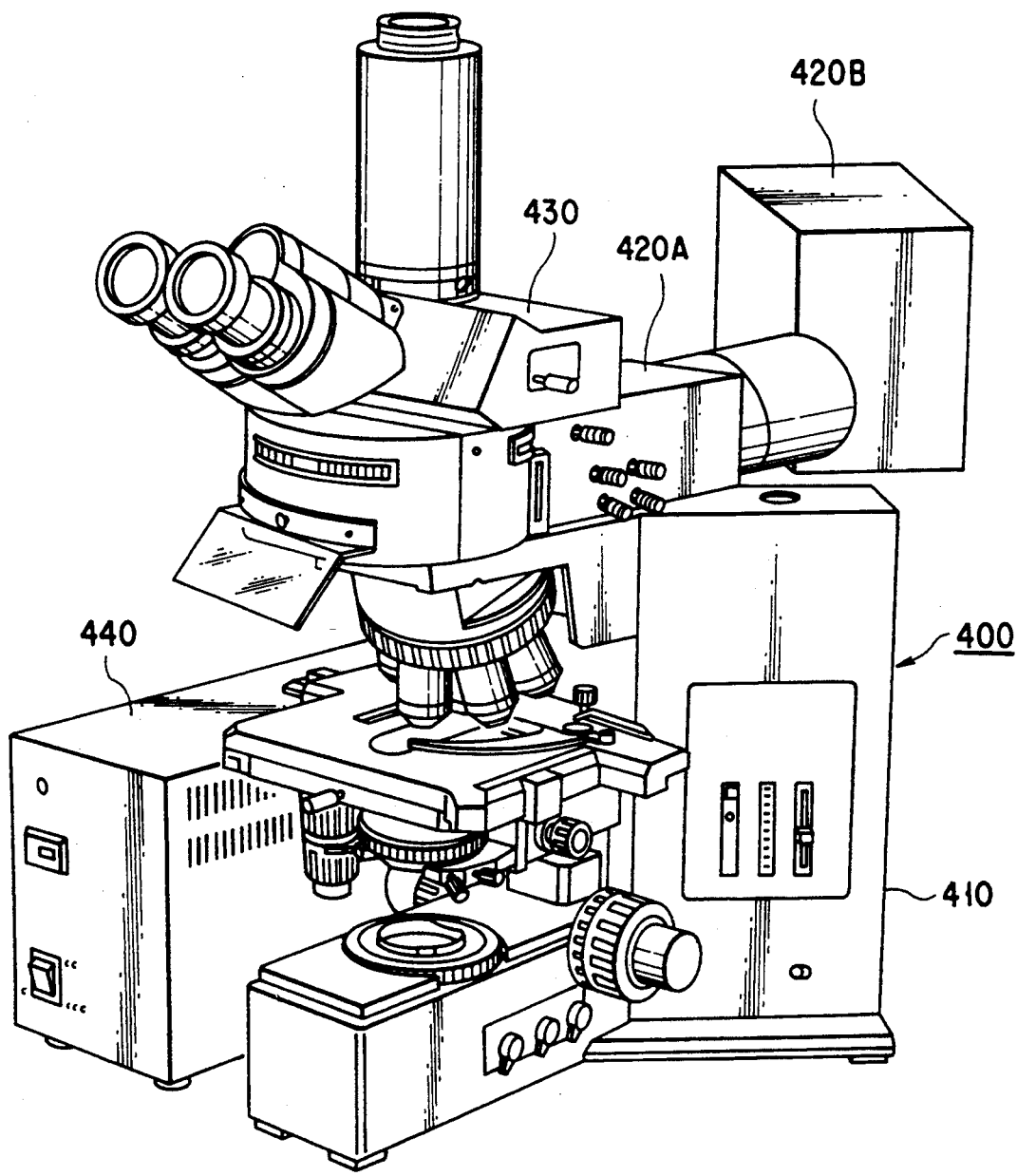
F I G. 17

MICROSCOPE HAVING Y-SHAPED FRAME STRUCTURE

BACKGROUND OF THE INVENTION

1. Field of the Invention

The present invention relates to a microscope utilized in the fields of medicine, biology, and the like and, more particularly, to a microscope having an improved frame.

2. Description of the Related Art

Microscopes are widely used in various fields, e.g., medicine and biology. A recent microscope of this type must satisfy the following conditions:
 (1) it must be a microscope capable of using a wide stage on which a small animal can be placed:
 (2) it must be a microscope capable of obtaining a wide operation space so that a sample can be operated by an accessory, e.g., manipulators;
 (3) it must be a microscope capable of using a light source system having a wide wavelength band so that it can observe a sample dyed with fluorochromes in a multiple manner;
 (4) it must be a microscope having such rigidity that the relative positions of its respective components, e.g., the relative positions of the sample and the objective lens, will not be changed by an external force or an external vibration; and
 (5) it must be a microscope satisfying the above conditions (1) to (4) and facilitating operations of its respective components.

Various types of microscopes have been developed to satisfy the conditions described above.

A conventional microscope will be described with reference to FIGS. 1A and 1B. More specifically, a microscope 100 shown in FIGS. 1A and 1B comprises a frame 110, an observation optical system 120, and an illumination optical system 130. The frame 110 comprises a base body 111 as a rectangular box body and an arm member 112 as an L-shaped cylindrical body. The arm member 112 has a pillar 112A and a horizontal arm 112B. A stage 124 and a stage rest 125 to be described later are arranged on the pillar 112A. The stage rest 125 and the observation optical system 120 is arranged on the horizontal arm 112B.

The base body 111 is placed on an installation surface. The installation surface can be the desktop of a desk in a laboratory. One end of the arm member 112 is connected to the base body 111. Reference numeral 113 denotes a cylinder attachment surface for attaching eyepieces and a lens barrel (neither are shown). Reference numerals 114 denote rubber feet 114 attached to the lower portions of the base body 111.

The observation optical system 120 has at least an eyepiece unit (not shown) comprising eyepieces (not shown) and a lens barrel (not shown), and an objective lens unit 123 comprising a revolver 121 and at least one objective lens 122 detachably attached to the revolver 121.

The eyepiece unit and the objective lens unit 123 are arranged along an imaginary optical axis. The observation optical system 120 has, in addition to the eyepiece unit and the objective lens unit 123, the stage 124 for placing a sample thereon, the stage rest 125 for receiving the stage 124, a vertical driving handle 126, and a focal point fine-adjusting mechanism (not shown). The focal point fine-adjusting mechanism is arranged in the pillar 112A. The observation and illumination optical systems 120 and 130 are mounted on the frame 110.

The illumination optical system 130 comprises insident and transmission light illumination optical systems 131 and 132. The incident light illumination optical system 131 comprises a lamphouse 131A incorporating a light source, and an optical path (not shown). The transmission light illumination optical system 132 comprises a lamphouse 132A incorporating a light source, and an optical path (not shown). The lamphouse 131A for the incident light illumination optical system 131 is arranged at the upper portion of the pillar 112A, and the lamphouse 132A for the transmission light illumination optical system 132 is arranged at the lower portion of the pillar 112A. The optical path for the incident light illumination optical system 131 is formed in the horizontal pillar 112B. The optical path for the transmission light illumination optical system 132 is formed in the base body 111 and the arm 112B.

Observation with this microscope is performed in the following manner. A sample (not shown) is placed on the stage 124. The observer rotates the vertical driving handle 126 with his hands or hand while looking into the eyepieces (not shown), thereby vertically moving the stage 124. Then, the focusing operation with the observation optical system 120 is achieved. In this case, since the stage 124 largely extends toward the observer, the arms of the observer are inevitably placed on the base body 111.

In the conventional microscope having the above arrangement, the base body 111 is rectangular and is supported by a four-points support structure including four rubber beets 114 arranged under four corners of the base body 111. This four-points support structure operates as the weight of the arm member 112 is concentrated on the point of the base body 111 immediately under the pillar 112A. Accordingly, when components, e.g., the lamphouses 131A and 132A are arranged on the arm member 112, a large rotational moment is generated to render the base body 111 unstable.

Since the base body 111 is rectangular, it needs a large installation area. Therefore, a work space needed for operating the sample with an accessory, e.g., manipulators, from the desk and an arrangement space needed for placing various components near the sample are small.

SUMMARY OF THE INVENTION

It is an object of the present invention to provide a microscope capable of ensuring a high stability.

It is another object of the present invention to provide a microscope capable of ensuring a large effective space.

The above objects are achieved by a microscope comprising:
 an observation optical system having at least an eyepiece unit and an objective lens unit arranged along an optical axis; and
 a frame for arranging the observation optical system thereon, the frame having a Y-shaped body, constituted by forming first and second members and a third member located immediately under the optical axis to substantially form a Y shape within an installation surface, and an arm member connected to the Y-shaped body.

With the microscope having this arrangement, a three-point support structure is formed by the first, second, and third members. The barycenter is set within an inverted triangle having these three points as the vertices. A rotational moment which is caused as the arm member, on which the observation optical system is arranged, is connected to the Y-shaped body is small. Therefore, a high stability can be ensured.

The above objects are also achieved by a microscope comprising:

an observation optical system having at least an eyepiece unit and an objective lens unit arranged along an optical system; and a frame having a base body for forming at least two effective spaces around a portion immediately under the optical axis, and an arm member connected to the base body.

With the microscope having this arrangement, even if the base body exists, since at least two effective spaces are formed around the portion immediately under the optical axis, a sample can be easily operated, and various attachments can be arranged close to the sample.

The above objects are also achieved by a microscope comprising:

an observation optical system having at least an eyepiece unit and an objective lens unit arranged along an optical axis;

a frame for arranging the observation optical system thereon, the frame having a Y-shaped body, constituted by forming a first foot extending along the optical axis, a second foot extending along the optical axis, and a base located immediately under the optical axis to substantially form a Y shape within an installation surface, and an arm member connected to the Y-shaped body and having at least the eyepiece unit and the objective lens unit mounted thereon;

light supply means comprising at least one of transmission light supply means for generating light to be transmitted through a sample and incident light supply means for generating light to be incident on the sample, and arranged on the frame; and means, arranged on the frame, for performing at least one of light amount control and light control display of the light supply means.

With the microscope having this arrangement, a three-point support structure is formed by the first, second, and third feet. The barycenter is set within an inverted triangle having these three points as the vertices. A point of the Y-shaped body immediately under the arm member, and the barycenter are close to each other. A rotational moment caused as the arm member, on which the observation optical system is arranged, is connected to the Y-shaped body is small. As a result, a high stability can be ensured.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 16 is an exploded perspective view showing a microscope according to the ninth embodiment of the present invention; and FIG. 17 is a perspective view showing the assembled state of the microscope according to the ninth embodiment of the present invention.

DETAILED DESCRIPTION OF THE PREFERRED EMBODIMENTS

Figures 1A, 1B:
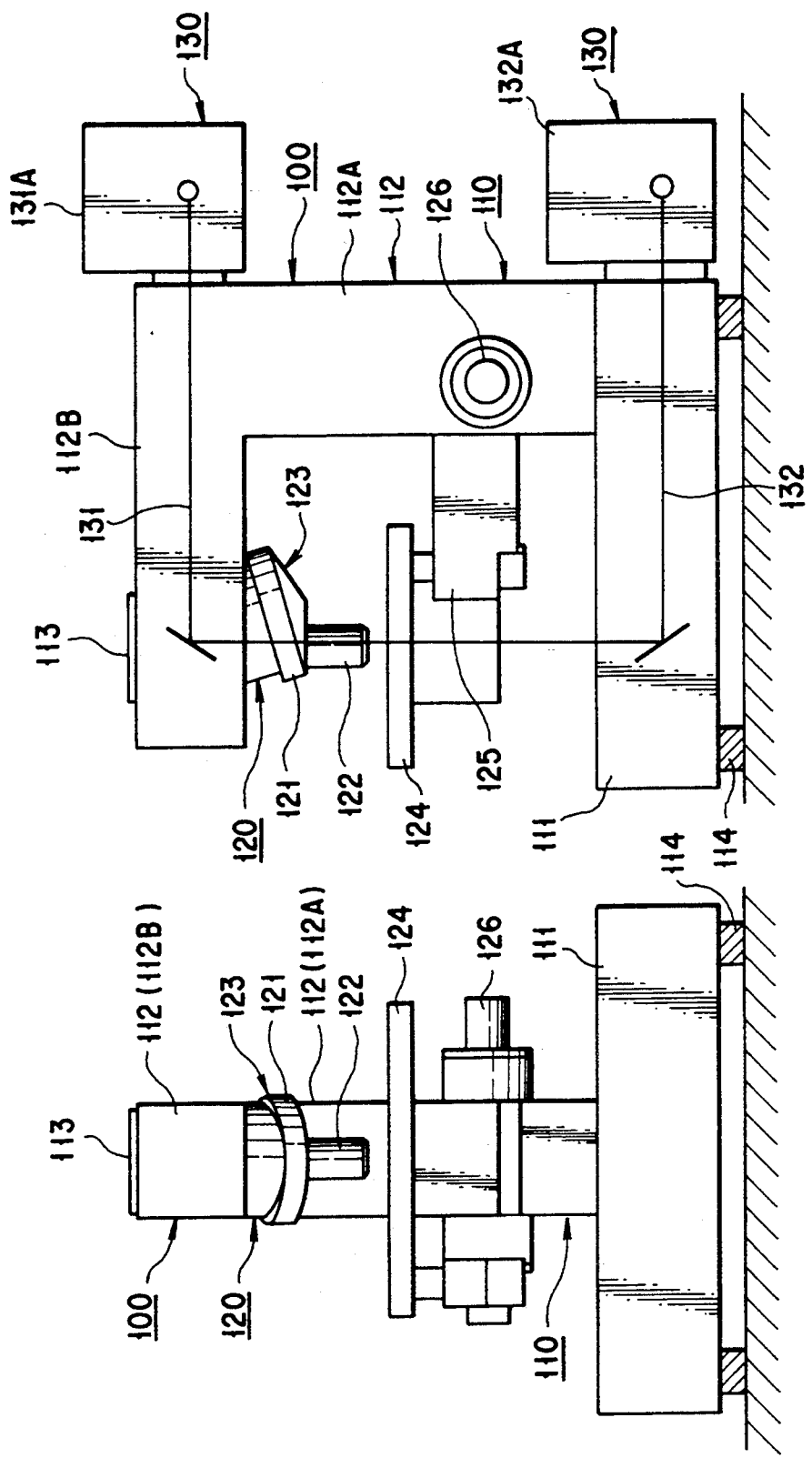
FIGS. 1A and 1B are front and side views, respectively, showing a conventional microscope.
Figure 2A:
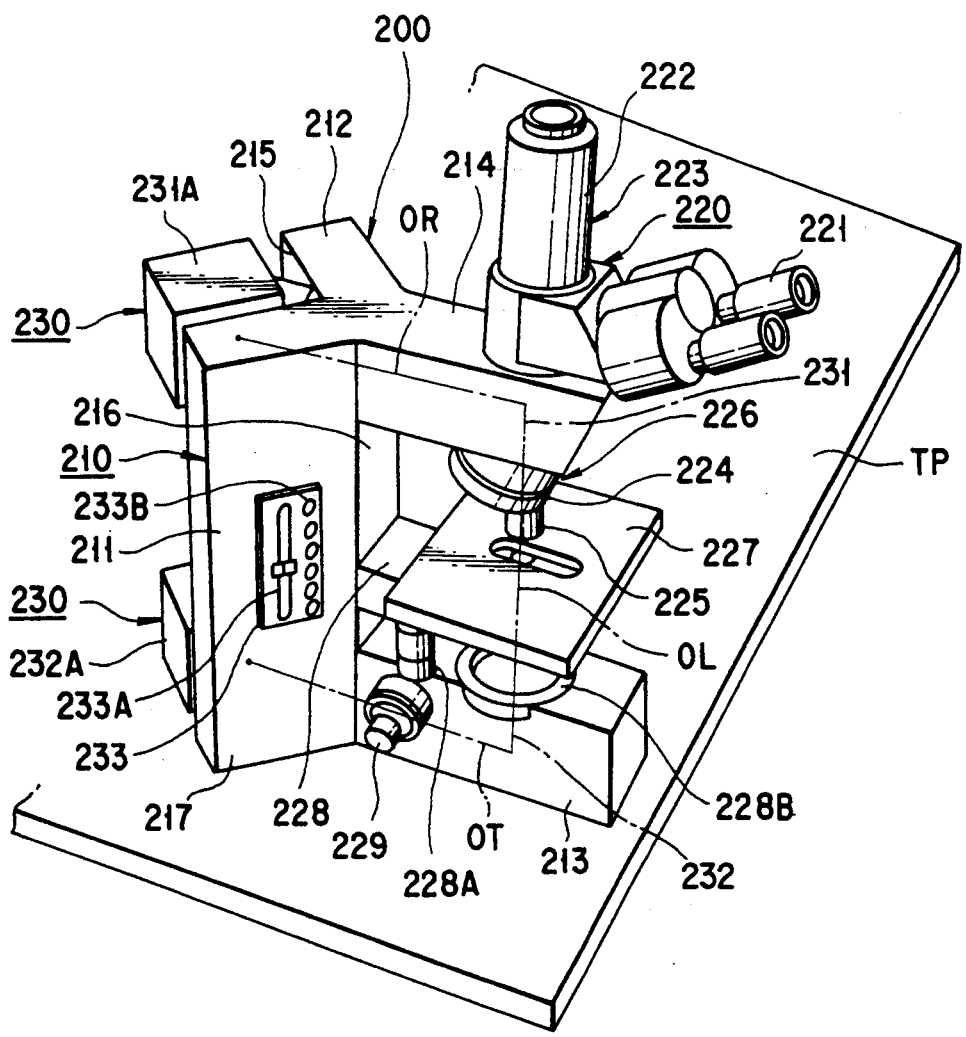
FIGS. 2A and 2B are perspective and plan views, respectively, showing a microscope according to the first embodiment of the present invention.
Figure 2B:
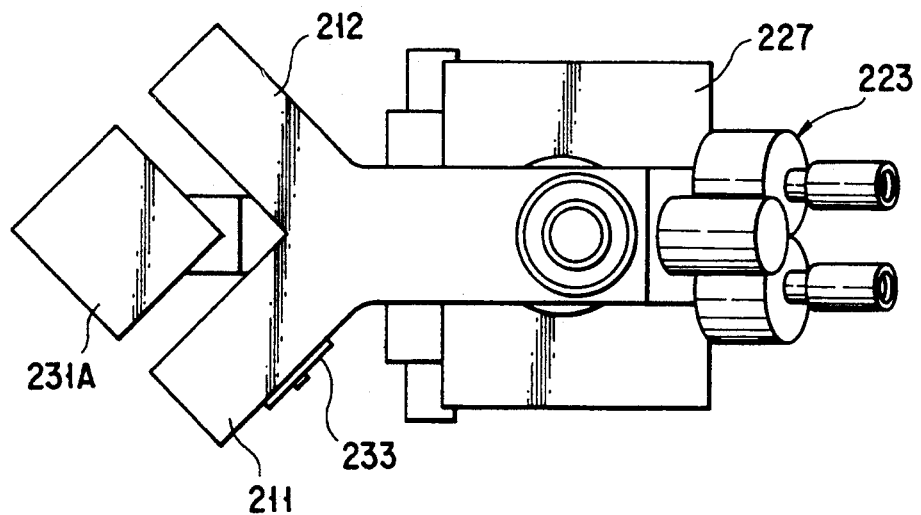

A microscope according to the first embodiment of the present invention will be described with reference to FIGS. 2A and 2B to FIGS. 8A, 8B, and 8C. As shown in FIGS. 2A and 2B, the microscope of the first embodiment comprises a frame 210, an observation optical system 220, and an illumination optical system 230.

The observation and illumination optical systems 220 and 230 are mounted on the frame 210. The observation optical system 220 has an imaginary optical axis OL. The optical axis OL includes an incident light illumination optical axis OR and a transmission light illumination optical axis OT. The frame 210 comprises first and second feet 211 and 212 extending along the optical axis OL, a base 213 located immediately under the optical axis OL, and a horizontal arm 214.

Figure 3:
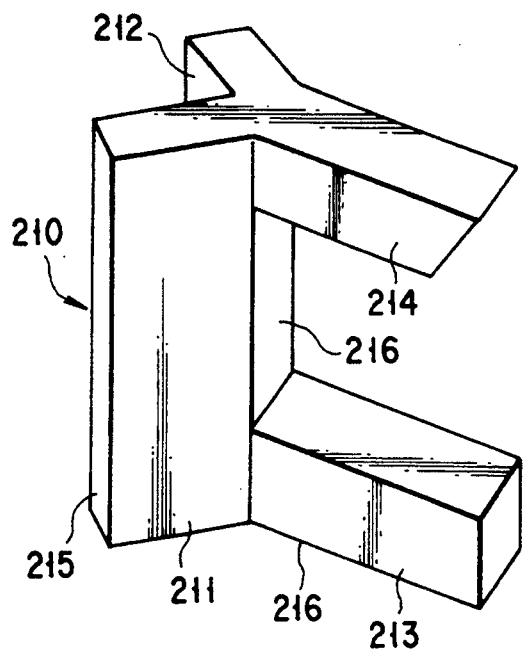
FIG. 3 is a perspective view showing a frame of the first embodiment.

As shown in FIGS. 2A and 3, one end of the first foot 211 and one end of the second foot 212 are connected to each other to form a V-shaped body 215 as a whole within an installation surface TP. The base 213 is connected to the lower portion of a ridge portion 216 of the V-shaped body 215 formed by the first and second feet 211 and 212. Accordingly, the first and second feet 211 and 212 and the base 213 are connected to each other to form a Y-shaped body 217 within the installation surface TP. It is preferable that the angle defined by the first and second feet 211 and 212 of the V-shaped body 215 is 60° to 120° in order to ensure the stability as the object of the present invention.

The horizontal arm 214 is connected to the upper portion of the ridge portion 216. Accordingly, the frame 210 can be regarded as the connection structure of the first and second feet 211 and 212, the base 213, and the horizontal arm 214.

The frame 210 can also be regarded as the connection structure of the V-shaped body 215, the base 213, and the horizontal arm 214.

The frame 210 can also be regarded as the connection structure of the Y-shaped body 217 and the horizontal arm 214. A portion of the Y-shaped body 217 close to the installation surface TP can be regarded as the base body. The combination of the horizontal arm 214 and a portion of the Y-shaped body 217 except for the base body can be regarded as an arm member. Accordingly, this connection structure can also be regarded as the connection structure of the base body and the arm member.

The frame 210 regarded as these connection structures can be manufactured by plastic working and welding of plate members or by casting, e.g., die-casting. The manufacturing method is not specifically limited as far as the frame 210 having the shape as shown in FIGS. 2A and 3 can finally be obtained.

A predetermined space is formed in the frame 210 regarded as these connection structures. The space in the frame 210 is utilized as a space for housing the components of the observation optical system 220. The space in the frame 210 is also utilized as the space for forming components (e.g., an optical path) of the illumination optical system 230.

A stage 227 and a stage rest 228 (which are to be described later) are arranged at the intermediate portion of the V-shaped body 215 in the longitudinal direction (the direction of the optical axis). The stage rest 228 and the observation optical system 220 are arranged on the horizontal arm 214. The Y-shaped body 217 is placed on the installation surface TP. The installation surface TP can be the desktop of a desk in a laboratory.

Figure 4:
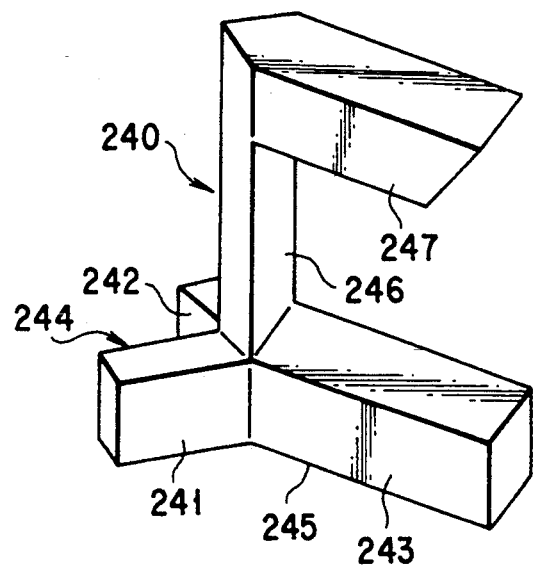
FIG. 4 is a perspective view showing another frame of the first embodiment.

The frame 210 shown in FIG. 3 is an example of the frame as the most important factor of the present invention. A frame 240 shown in FIG. 4 is also incorporated in the scope of the frame of the present invention. More specifically, one end of a first foot 241 and one end of a second foot 242 of the frame 240 shown in FIG. 4 are connected to each other to form a V-shaped body 244 as a whole within an installation surface TP. A base 243 is connected to the connecting portion of the V-shaped body 244 formed by the first and second feet 241 and 242. Accordingly, the first and second feet 241 and 242 and the base 243 are connected to each other to form a Y-shaped body 245 within the installation surface TP. It is preferable that the angle defined by the first and second feet 241 and 242 of the V-shaped body 244 is 60° to 120°, in the same manner as in the frame 210 shown in FIGS. 2A and 3, in order to ensure the stability as the object of the present invention.

One end portion of a pillar 246 is connected to the connecting portion of the V-shaped body 244 at a right angle. The other end portion of the pillar 246 is connected to one end portion of a horizontal arm 247. Accordingly, the frame 240 can be regarded as the connection structure of the first and second feet 241 and 242, the base 243, the pillar 246, and the horizontal arm 247.

The frame 240 can also be regarded as the connection structure of the V-shaped body 244, the base 243, the pillar 246, and the horizontal arm 247.

The frame 240 can also be regarded as the connection structure of the Y-shaped body 245, the pillar 246, and the horizontal arm 247. A portion of the Y-shaped body 245 close to the installation surface TP can be regarded as the base body. The combination of the pillar 246 and the horizontal arm 247 can be regarded as an arm member. Accordingly, the frame 240 can also be regarded as the connection structure of the base body and the arm member.

The frame 240 regarded as these connection structures can be manufactured by plastic working and welding of plate members or by casting, e.g., die-casting, like the frame 210 shown in FIGS. 2A and 3. The manufacturing method is not specifically limited as far as the frame 240 having the shape as shown in FIG. 4 can finally be obtained.

A predetermined space is formed in the frame 240 regarded as these connection structures, as in the frame 210 shown in FIGS. 2A and 3.

The first and second feet 211 and 212 of the frame 210 shown in FIG. 3 have sizes, along the optical axis, to reach the summit of the horizontal arm 214 constituting the arm member. On the other hand, the sizes of the first and second feet 241 and 242 and the base 243 of the frame 240 shown in FIG. 4 are equal to each other along the optical axis. However, the entire shape of the frame of the present invention is not specifically limited as far as the frame shape on the installation surface TP forms a Y shape.

The observation optical system 220 in FIG. 2A has at least an eyepiece unit 223 comprising eyepieces 221 and a lens barrel 222, and an objective lens unit 226 comprising a revolver 224 and at least one objective lens 225 detachably mounted on the revolver 224. The eyepiece unit 223 and the objective lens unit 226 are arranged along the imaginary optical axis OL.

The observation optical system 220 has, in addition to the eyepiece unit 223 and the objective lens unit 226, the stage 227 for placing a sample thereon, the stage rest 228 for receiving the stage 227, a vertical driving handle 229, and a focal point fine-adjusting mechanism (not shown). The focal point fine-adjusting mechanism is arranged in the space in the V-shaped body 215. Reference numeral 228A denotes a handle for moving the stage 227 within a horizontal plane by fine adjustment. Reference numeral 228B denotes a collector lens arranged along the optical axis OT.

The illumination optical system 230 shown in FIGS. 2A and 2B comprises transmission and incident light illumination optical systems 231 and 232 each comprising a optical device arranged on the optical axis OR and OT. The incident light illumination optical system 231 comprises a lamphouse 231A incorporating a light source, and an optical path (not shown). The transmission light illumination optical system 232 comprises a lamphouse 232A incorporating a light source, and an optical path (not shown). The lamphouse 231A for the incident light illumination optical system 231 is arranged in the V-shaped space on the upper portion of the V-shaped body 215, and the lamphouse 232A for the transmission light illumination optical system 232 is arranged in the V-shaped space on the lower portion of the V-shaped body 215.

The optical path for the incident light illumination optical system 231 is formed in the horizontal arm 214. The optical path for the transmission light illumination optical system 232 is formed in the base 213. Reference numeral 233 denotes an operation unit for a light amount control volume 233A and a light control display 233B of the illumination optical system 230. The operation unit 233 is arranged on the first foot 211 of the V-shaped body 215. The operation unit 233 can also be arranged on the second foot 212 of the V-shaped body 215, as the matter of course.

Observation with the microscope of the first embodiment having the above arrangement is performed in accordance with the following order. A sample, e.g., a glass slide, is placed on the stage 227. The observer rotates the vertical driving handle 229 with his hands or hand while looking into the eyepieces 221, thereby vertically moving the stage 227. Then, the focusing operation with the observation optical system 220 is achieved.

The frame 210 of this embodiment forms a Y shape on the installation surface TP. This allows the observer to place his arms on the installation surface TP during observation. Hence, the observer can perform observation with a relaxed posture.

The installation area of a microscope 200 with respect to the installation surface TP is smaller than that of the conventional microscope. Then, the work space around the microscope 200 is increased, which is advantageous.

Figure 5:
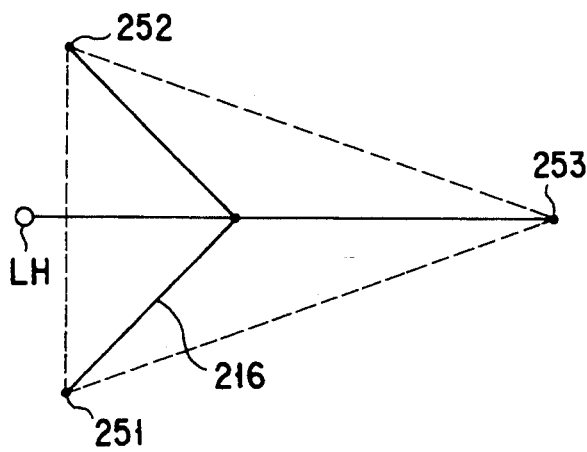
FIG. 5 is view for explaining the stability of the Y-shaped base body of the microscope according to the first embodiment of the present invention.

The stability of the microscope 200 of this embodiment comprising the frame 210 having a Y-shaped body 216 will be described with reference to FIGS. 5 and 6. More specifically, as shown in FIG. 5, the frame 210 forms a three-point support structure with its first and second feet 211 and 212 and base 213.

This three-point support structure is defined by the Y-shaped body 216. Referring to FIG. 5, a point 251 indicates a support point of the first foot 211 on the installation surface TP; a point 252, a support point of the second foot 212 on the installation surface TP; and a point 253, a support point of the base 213 on the installation surface TP. An inverted triangle having the points 251, 252, and 253 as the vertices can be assumed. When the lamphouse LH located at a position outside of a line connecting the points 251 and 252, this barycenter is located in the inverted triangle. Accordingly, the rotational moment caused by the arm member on which the lamphouse LH is arranged is small. As a result, a high stability can be ensured.

Figure 6:
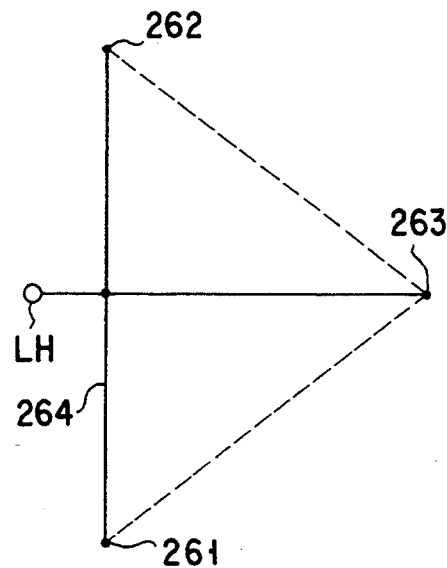
FIG. 6 is a view for explaining the stability of a T-shaped base body.

FIG. 6 shows a frame 260 having a three-point support structure including points 261, 262, and 263. The frame 260 has a T-shaped body 264. A triangle having the points 261, 262, and 263 as the vertices can be assumed. The barycenter of the microscope as a whole is preferable to set within this triangle. When the lamphouse LH located at a position outside of a line connecting the points 251 and 252, the barycenter is located in the inverted triangle. T-shaped body 264, the rotational moment is large and the stability is low. In this case, the rotational moment for the back forward direction is caused by the arm member on which the observation optical system 220 is arranged.

Figure 7:
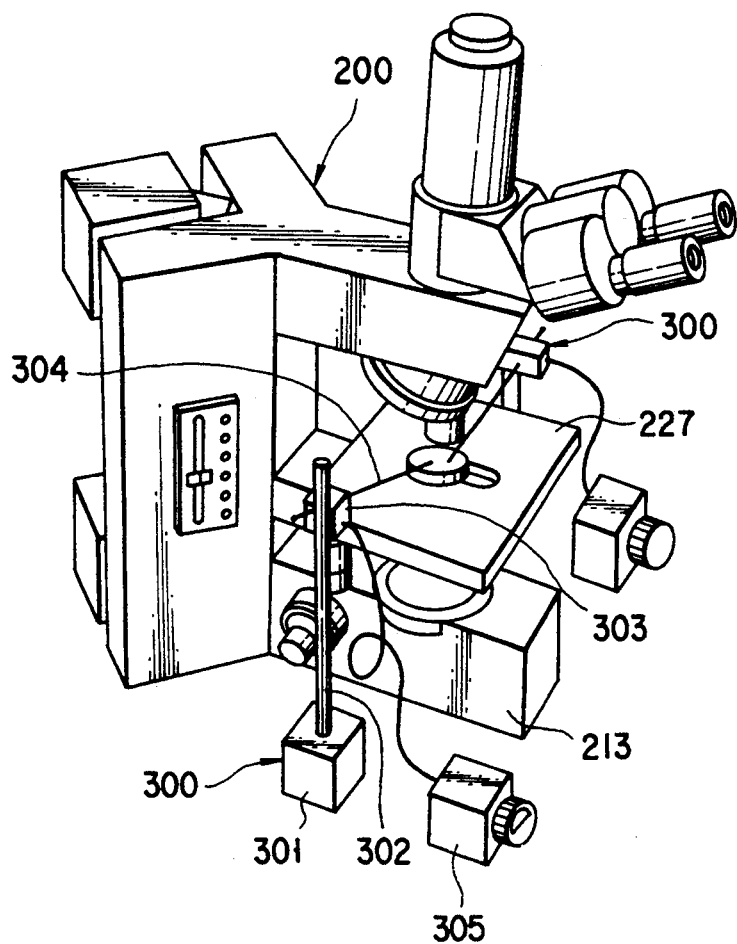
FIG. 7 is a view showing a state exhibiting the effect of the first embodiment wherein a sample is operated by an accessory, e.g., manipulators.

Furthermore, as shown in FIG. 7, since a large space can be preserved around the stage 227 on the installation surface TP, an accessory, e.g., manipulators can be installed on the installation surface TP. The sample can be operated by the accessory. Since various types of attachments can be placed close to the sample, this microscope is very advantageous against vibration and the like. More specifically, as shown in FIG. 7, a large effective space is assured around the portion on the installation surface TP immediately under the optical axis OL. This space is formed to extend on each of the two sides of the base 213 in the longitudinal direction. A pair of manipulators 300 can be arranged, as the accessory, on the spaces formed on the two sides of the base 213 in the longitudinal direction. Accessories other than the manipulators 300 can be arranged on these spaces. Each manipulator 300 comprises a base 301, a pillar 302 invertedly provided on the base 301, an actuator 303 fixed to the end portion of the pillar 302, an operation member 304 operated by the actuator 303, and a controller 305 for controlling the actuator 303. When the installation surface TP is made of a magnetic material, the base can incorporate a magnet. In this case, the base 301 can be easily fixed on the installation surface TP containing the magnetic material. The sample on the stage 227 can be operated by the pair of manipulators 300.

According to the microscope of this embodiment, since large spaces can be assured on the two sides of the base 213, the large stage 227 for placing a large sample thereon can be attached.

Figures 8A, 8B, 8C:
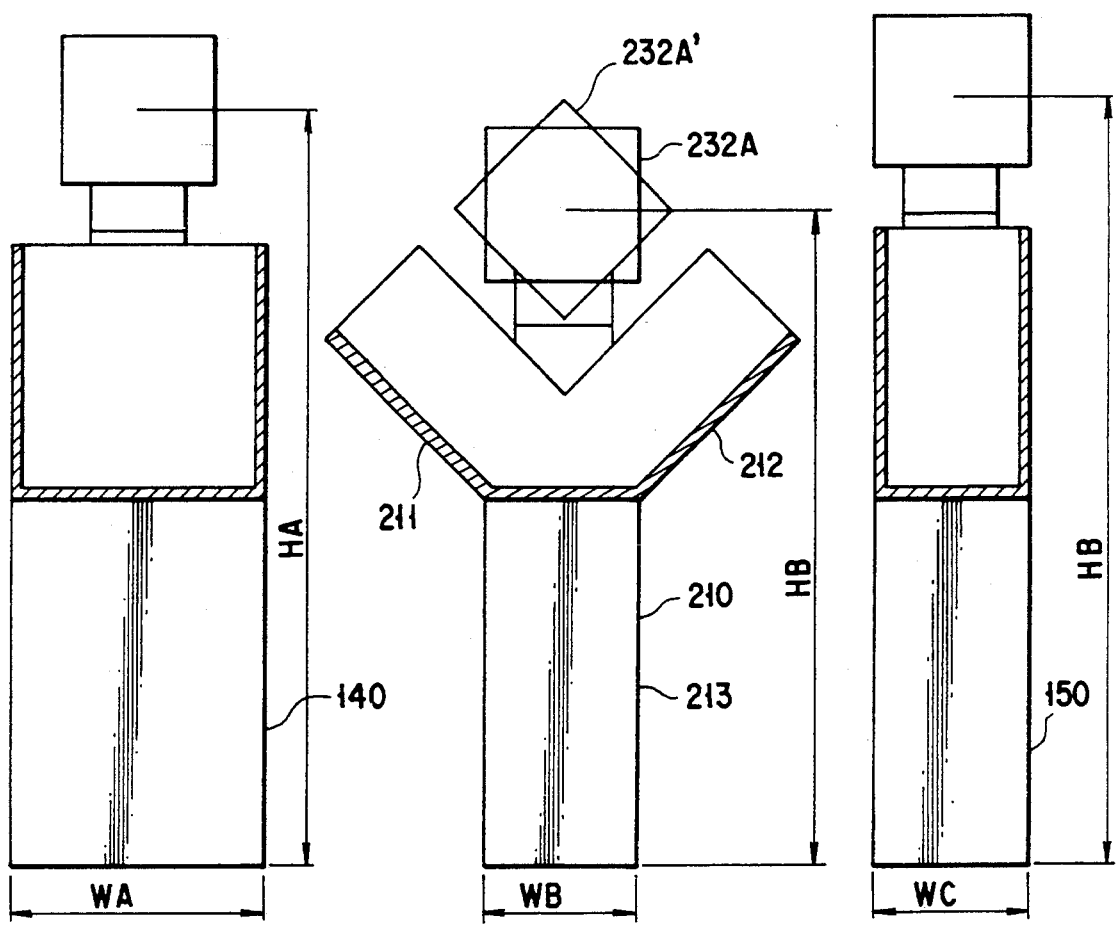
FIGS. 8A, 8B, and 8C are schematic plan views for explaining the effect of the first embodiment in comparison with that of the conventional microscope.

The microscope of this embodiment and two conventional microscopes will be compared with reference to FIGS. 8A, 8B, and 8C. More specifically, FIGS. 8A, 8B, and 8C show the sections of the respective microscopes in planes parallel to the corresponding installation surfaces. FIGS. 8A and 8C show different conventional microscopes, and FIG. 8B shows the microscope of this embodiment. The thicknesses of the sections of the respective microscopes are the same, and the two-dimensional moments of the sections thereof are also the same. The foot portion of each microscope is open toward the lamphouse thereof. This structure is convenient when incorporating a structure in the frame including the foot portion. The open foot portion can be closed with a lid body (not shown).

FIG. 8A shows a frame 140 of the first conventional microscope. The frame 140 includes a square body on the installation surface. FIG. 8B shows the frame 210 of the first embodiment of the present invention. The frame 210 includes a Y-shaped body on the installation surface. FIG. 8C shows a frame 150 of the second conventional microscope. The frame 150 includes a rectangular body on the installation surface. A distance HA in the frame 140 of the first conventional microscope between the observer and the lamphouse, a distance HB in the frame 210 of this embodiment between the observer and the lamphouse 232A, and a distance HC in the frame 150 of the second conventional microscope between the observer and the lamphouse, are defined as shown in FIGS. 8A, 8B, and 8C, respectively.

When the distances HA, HB, and HC described above are compared, they satisfy $HA > HB$ and $HC > HB$. Hence, in the frame 210 of this embodiment having the distance HB which is smaller than those of the first and second conventional microscopes, the various operations of the lamphouse 232A can be facilitated. The microscope of this embodiment can be used even on an installation surface having a small depth. Since a width WB of the frame 210 of this embodiment is smaller than widths WA and WC of the frames of the conventional microscopes, the observer can easily access the sample.

The frame 210 of this embodiment shown in FIG. 8B can use a rectangular or rhombic lamphouse 232A (232A').

In this embodiment, since the operation unit 233 for the illumination optical system 230 and having the control volume 233A and the light control display 233B is arranged on the first foot 211 of the V-shaped body 215, advantages can be obtained as follows. Operations during observation include a focusing operation performed by the observer while looking into the eyepieces 221 and a sample moving operation performed by means of the stage 227. When the magnification is changed by the revolver 224, illumination light must be adjusted. In the conventional microscope, even if the light control display and the operation unit are close at hand, the observer cannot see the operation unit unless he shifts the visual axis largely off the eyepieces 221.

In contrast to this, according to this embodiment, the frame 210 has the Y-shaped body 216 located on the installation surface. Then, the area of the front surface of the frame 210 is increased, and the operation unit 233 can be easy arranged at a location of the installation surface. As a result, the observer can easy confirm the position of the operation unit 233 only by shifting the eyes slightly off the eyepieces 221.

Therefore, the control volume 233A can be adjusted to a desired value while confirming the light control display 233B without largely shifting the eyes off the eyepieces 221.

An operating means, e.g., an operation knob and a lever that can be arranged on the front surface of the frame 210 can be easily operated. The two arms of the observer can be placed on the two sides of the base 213 such that they naturally sandwich the base 213 of the Y-shaped body 216. The two hands can naturally reach the two wall surfaces of the V-shaped body 215. Then, the observer can operate the operation knob and the lever that can be arranged on the front surface of the frame 210 with less fatigue. A display and the operation knob that are needed can be provided on either of the two wall surfaces of the V-shaped body 215. For example, switching operation units, e.g., a filter IN-OUT lever, a power supply switch, and a photographic release button which are necessary for observation may be provided on the two wall surfaces of the V-shaped body 215.

Figure 9:
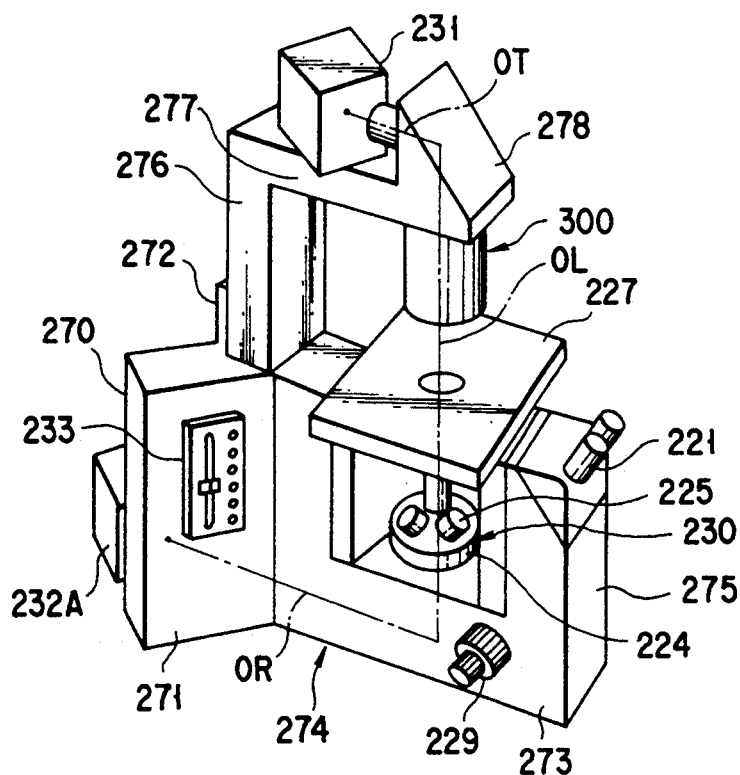
FIG. 9 is a perspective view showing a microscope according to the second embodiment of the present invention.

The second embodiment of the present invention will be described with reference to FIG. 9. The second embodiment exemplifies an inverted microscope 300 having a frame of the present invention. The first embodiment exemplifies the erecting microscope 200. It is regarded that in the erecting microscope 200 of the first embodiment, the observation optical system 220 is mounted on the arm member connected to the Y-shaped body 216. It is regarded that in the inverted microscope 300 of the second embodiment, an observation optical system 220 is mounted on a base 273 of a frame 270 having a Y-shaped body. Referring to FIG. 9, components having the same functions as those in FIGS. 2A and 2B are denoted by the same reference numerals.

The inverted microscope 300 of the second embodiment shown in FIG. 9 has the frame 270. The frame 270 has a Y-shaped body 274 comprising first and second feet 271 and 272 and the base 273. An eyepiece pillar 275, a pillar 276, a horizontal arm 277, and a corner member 278 are integrally connected to the Y-shaped body 274.

In the second embodiment shown in FIG. 9, since the frame 270 including an incident light illumination optical axis OR has the Y-shaped body 274 placed on an installation surface (not shown), the stability similar to that in the first embodiment can be ensured, and a sufficient space can be assured.

Figure 10:
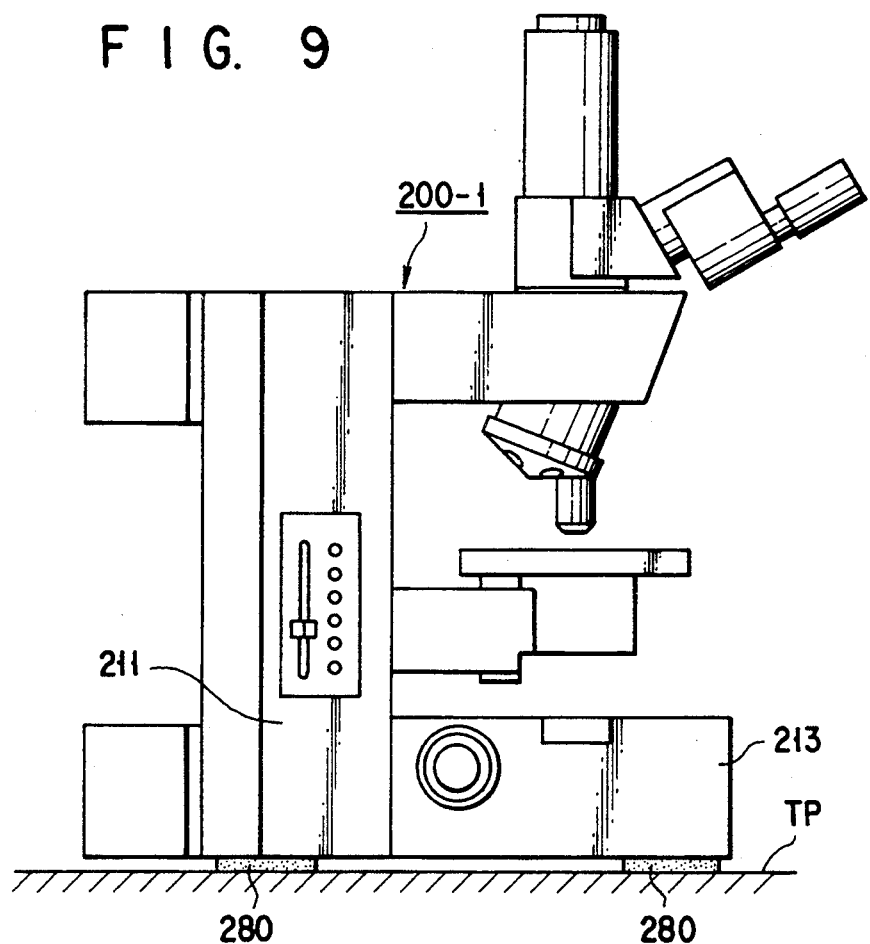
FIG. 10 is a side view showing a microscope according to the third embodiment of the present invention.

The third embodiment of the present invention will be described with reference to FIG. 10. In the third embodiment, at least one elastic body 280, e.g., a rubber foot, is fixed to the lower portion of a frame 210 identical to that of the first embodiment. In a microscope 200-1 of the third embodiment, at least one elastic body 280, e.g., a rubber foot, fixed to the lower portion of the frame 210 more or less contributes to an improvement of the anti-vibration properties and stability.

Figure 11:
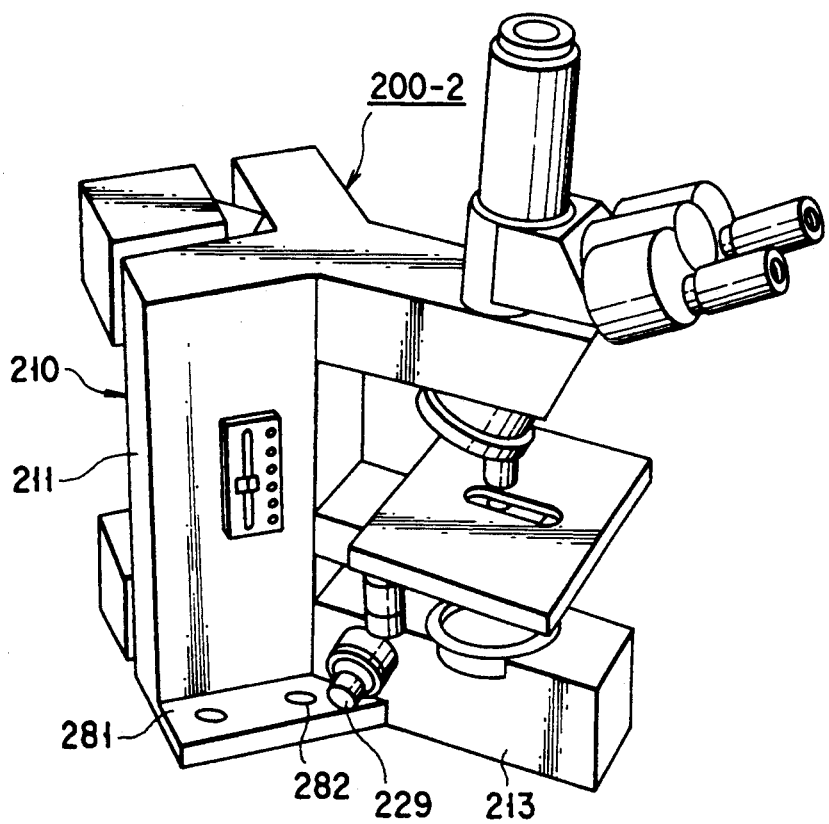
FIG. 11 is a perspective view showing a microscope according to the fourth embodiment of the present invention.

The fourth embodiment of the present invention will be described with reference to FIG. 11. In the fourth embodiment, a plate-like support wing 281 having a square section is provided to the lower portion of a first foot 211 of a frame 210. At least one through hole 282 is formed in the support wing 281. A support wing identical to the support wing 281 can be provided to the lower portion of a second foot 212.

In a microscope 200-2 of the fourth embodiment, the projecting amount and thickness of the support wing 281 have a function of ensuring the stability of the microscope as a whole at a degree not impairing the operability of a vertical driving handle 229. In addition to normal microscopic observation, the through hole 282 is used for the purpose of vibration prevention or special specifications, such that the microscope is to be fixed on a stationary plate or disk so that a heavy accessory can be attached to the microscope. Conventionally, before a microscope is to be fixed on a stationary plate, an optional plate is attached to the microscope by utilizing the screw of the rubber foot attachment portion, and this requires a relatively cumbersome operation. In contrast to this, in the microscope 200-2 of the fourth embodiment, the frame 210 can be easily fixed. When the frame 210 need not be fixed, a member, e.g., a chain or a key is fixed to the through hole 282 to prevent the microscope 200-2 from being taken away without notice or stolen. Then, the microscope 200-2 can be prevented from falling down or being stolen.

Figure 12:
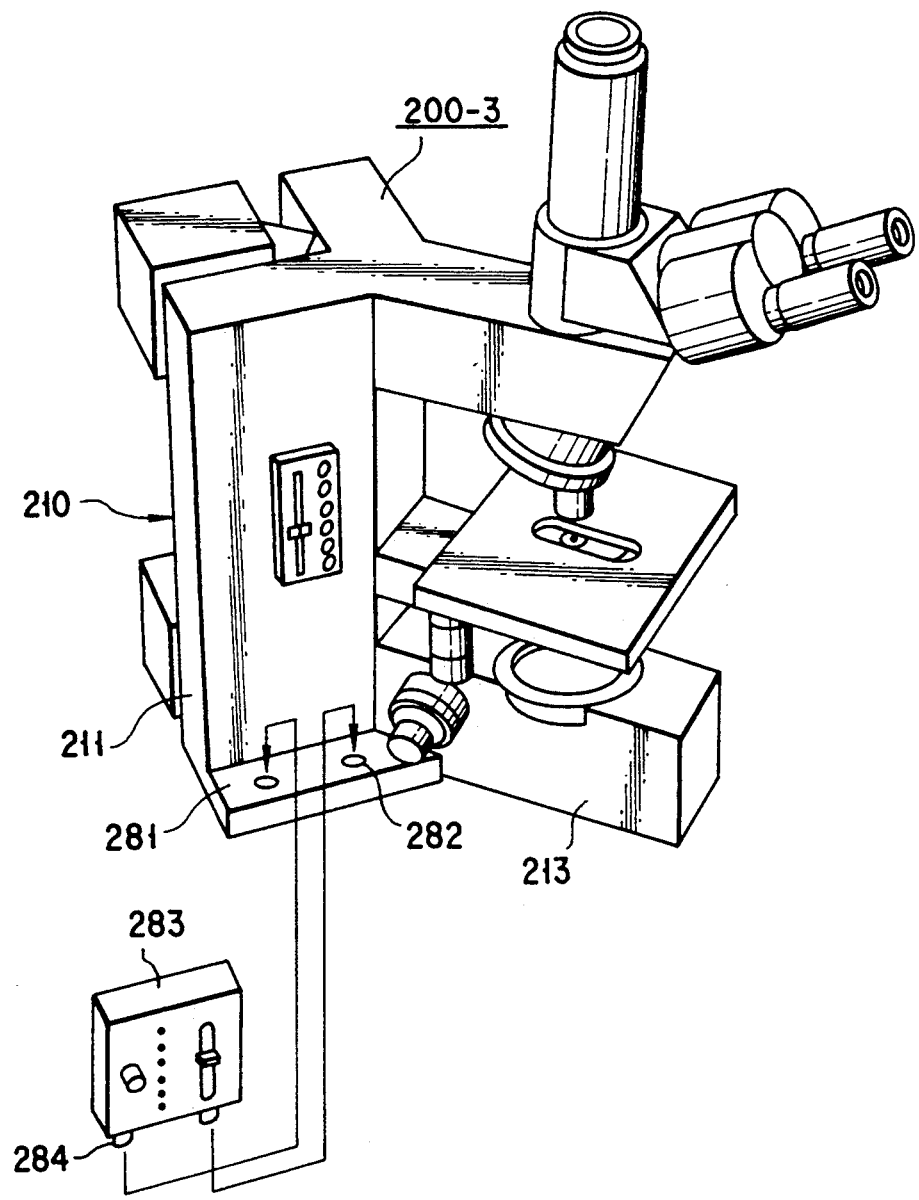
FIG. 12 is a perspective view showing a microscope according to the fifth embodiment of the present invention.

The fifth embodiment of the present invention will be described with reference to FIG. 12. In a microscope 200-3 of the fifth embodiment, an operation remote control box 283 is detachably arranged on a support wing 281 by utilizing through holes 282 in the support wing 281. Projections 284 corresponding to the through holes 282 are formed on the operation remote control box 283.

In the conventional microscope, when a motor revolver as an option is to be additionally mounted on the microscope, the operation remote control box of the motor revolver must be placed on the desktop near the frame. Then, the operation remote control box becomes far from the observation position and thus becomes difficult to operate. In contrast to this, according to the fifth embodiment, since the operation remote control box 283 can be installed on the support wing 281 so that a frame 210 has the operation unit, the microscope can be sufficiently operated during observation. According to the fifth embodiment, the through holes 282 can serve both to fix the operation remote control box 283 on the frame 210 and fix the microscope on the desktop or the like. The operation remote control box 283 may be mounted on either of the two wall surfaces of a V-shaped body 215 of the frame 210.

Figure 13:
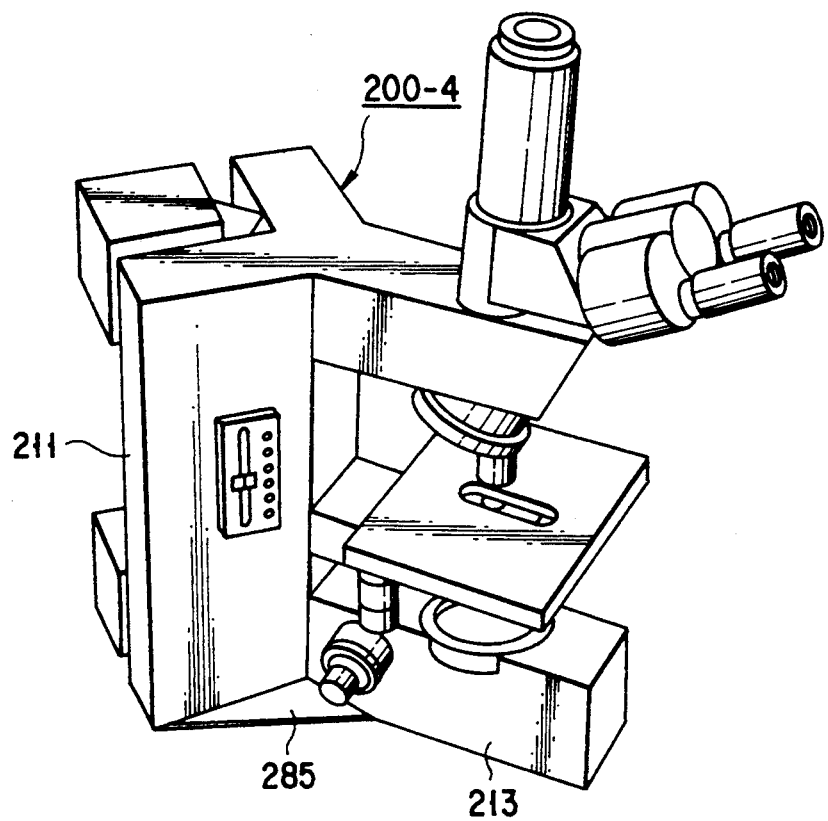
FIG. 13 is a perspective view showing a microscope according to the sixth embodiment of the present invention.

The sixth embodiment of the present invention will be described with reference to FIG. 13. In a microscope 200-4 of the sixth embodiment, a triangular support wing 285 is provided to a first foot 211 of a frame 210.

Figure 14:
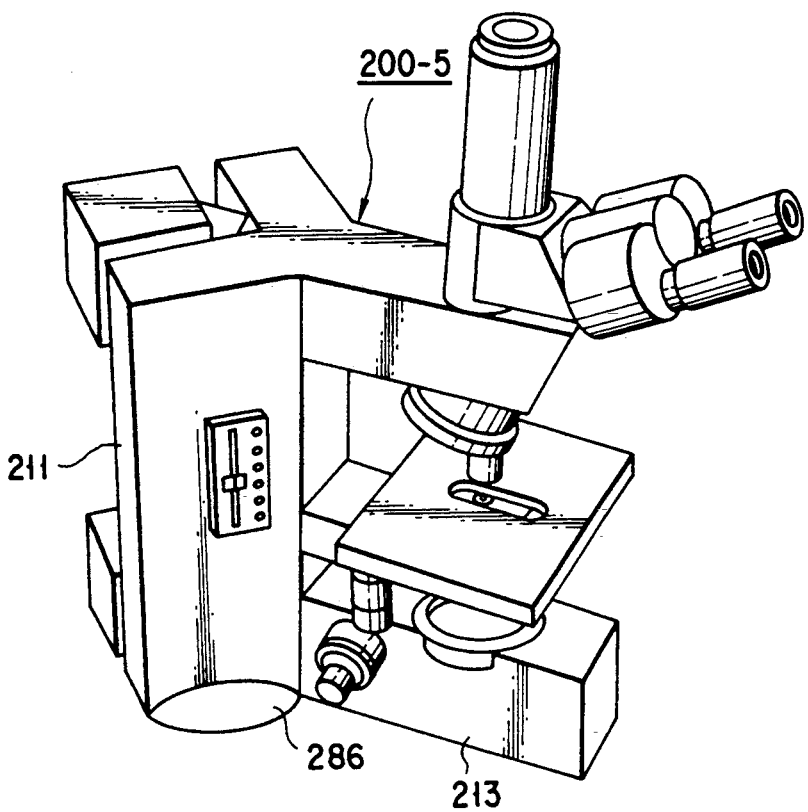
FIG. 14 is a perspective view showing a microscope according to the seventh embodiment of the present invention.

The seventh embodiment of the present invention will be described with reference to FIG. 14. In a microscope 200-5 of the seventh embodiment, an arcuated support wing 286 is provided to a first foot 211 of a frame 210.

Figure 15:
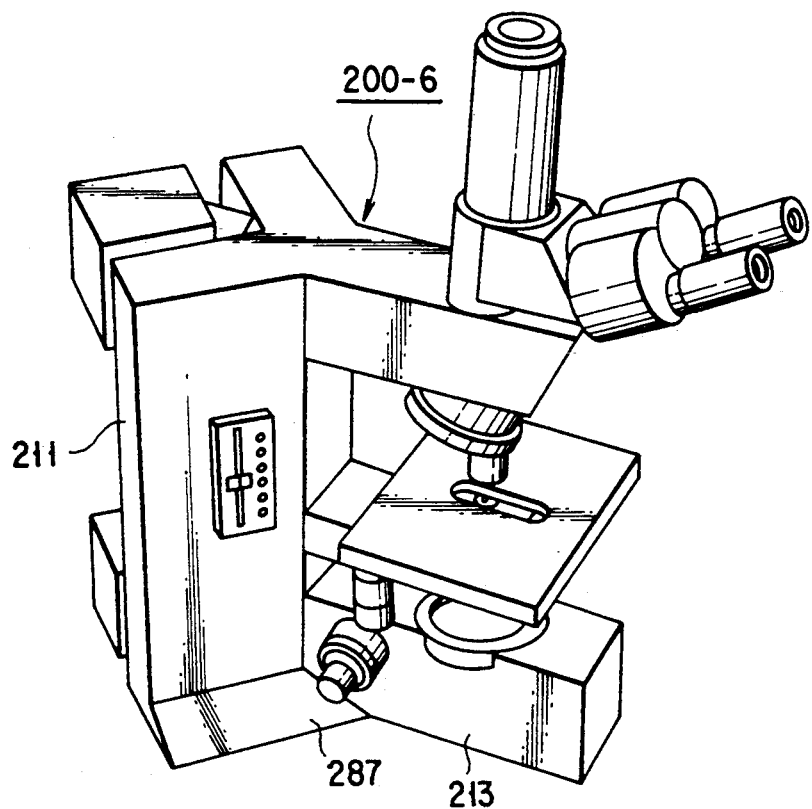
FIG. 15 is a perspective view showing a microscope according to the eighth embodiment of the present invention.

The eighth embodiment of the present invention will be described with reference to FIG. 15. In a microscope 200-6 of the eighth embodiment, a support wing 287 having a tapered section is provided to a first foot 211 of a frame 210. In these microscopes 200-4, 200-5, and 200-6 of the sixth, seventh, and eighth embodiments, the support wings 285, 286, and 287 contribute to the stability, as in the microscope 200-2 of the fourth embodiment.

The ninth embodiment of the present invention will be described with reference to FIGS. 16 and 17. The ninth embodiment uses a frame 410 similar to the frame 210 described above. As shown in the exploded view of FIG. 16, a portion of the frame 410 opposing the installation surface forms a Y-shaped body. An incident light illumination member 420A is arranged between the frame 410 and an eyepiece unit 430 placed on the frame 410.

As shown by the assembled state in the view of FIG. 17, in a microscope 400 of the ninth embodiment, a lamphouse 420B is provided to the incident light illumination member 420A. A power supply 440 is arranged near the frame 410. In the microscope 400 of the ninth embodiment, since the portion of the frame 410 opposing the installation surface forms the Y-shaped body, the stability is ensured, and an effective space can be assured.

As has been described above, the microscope according to the present invention has various advantages such that it can obtain a large sample operating space, it can cope with a large stage for placing a large sample thereon, it has rigidity, it has a high operability of the light source system, it requires a less space, and it has a high stability.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A microscope comprising:
    an observation optical system having at least an eyepiece unit and an objective lens unit arranged along an optical axis; and
    a frame for arranging said observation optical system thereon, said frame including:
        a Y-shaped body having first and second members and a third member located immediately under the optical axis, said first, second and third members being arranged and interconnected to form a substantially Y shape within an installation surface; and
        an arm member connected to said Y-shaped body; said first and second members lengths to reach a summit of said arm member.

2. A microscope according to claim 1, wherein said first and second members are longer, along the optical axis, than said third member along the optical axis.

3. A microscope according to claim 1, wherein said eyepiece unit and said objective lens unit in said observation optical system are mounted on said arm member.

4. A microscope according to claim 1, wherein said eyepiece unit and said objective lens unit in said observation optical system are mounted on said third member.

5. A microscope according to claim 1, further comprising a light supply system, arranged on said frame, for supplying light to said observation optical system.

6. A microscope according to claim 5, wherein said light supply system comprises a lamphouse having a light source, and an optical path for supplying light from said light source of said lamphouse to said observation optical system.

7. A microscope according to claim 5, wherein said light supply system comprises transmission light supply means for generating light to be transmitted through a sample, and incident light supply means for generating light to be incident on the sample.

8. A microscope according to claim 6, wherein said optical path is formed in said frame.

9. A microscope according to claim 6, wherein said lamphouse is arranged on said frame.

10. A microscope according to claim 6, wherein said light supply means further comprises a light amount controller and a light control display unit.

11. A microscope according to claim 10, wherein at least one of said light amount controller and said light control display unit is arranged on said frame.

12. A microscope according to claim 1, wherein said first and second members comprise support wings that extend within the installation surface.

13. A microscope according to claim 12, wherein said support wings have tapered sections.

14. A microscope according to claim 12, wherein said support wings have triangular shapes within the installation surface.

15. A microscope according to claim 12, wherein said support wings have arcuated shapes within the installation surface.

16. A microscope according to claim 12, wherein said support wings have through holes therein for fixing said frame.

17. A microscope according to claim 16, wherein the through holes are arranged for fixing a remote control box to said frame.

18. A microscope according to claim 1, wherein said first and second members define an angle of 60° to 120° therebetween.

19. A microscope according to claim 1, further comprising an accessory used for enlarged observation.

20. A microscope according to claim 1, further comprising an upper illumination optical system arranged between said eyepiece unit and said arm member.

21. A microscope according to claim 1, wherein at least one elastic member is arranged on a surface of said frame opposing the installation surface.

22. A microscope comprising:

an observation optical system having at least an eyepiece unit and an objective lens unit arranged along an optical axis;

a frame for arranging said observation optical system thereon, said frame having a Y-shaped body, said Y-shaped body including a first foot extending along the optical axis, a second foot extending along the optical axis, and a base located immediately under the optical axis, said first foot, second foot and a base being arranged to substantially form said Y-shaped body within an installation surface, and an arm member connected to said Y-shaped body, said arm member having at least said eyepiece unit and said objective lens unit mounted thereon;

light supply means comprising at least one of transmission light supply means for generating light to be transmitted through a sample and incident light supply means for generating light to be incident on the sample, and arranged on said frame; and means, arranged on said frame, for performing at least one of light amount control and light control display of said light supply means.

23. A microscope comprising:

an observation optical system having at least an eyepiece unit and an objective lens unit arranged along an optical axis; and a frame for arranging said observation optical system thereon, said frame including:

a Y-shaped body having first and second members and a third member located immediately under the optical axis, said first, second and third members being arranged and interconnected to substantially form said Y-shaped body within an installation surface; and an arm member connected to said Y-shaped body;

wherein said first and second members comprise support wings that extend within the installation surface.

24. A microscope according to claim 23, wherein said support wings have tapered sections.

25. A microscope according to claim 23, wherein said support wings have triangular shapes within the installation surface.

26. A microscope according to claim 23, wherein said support wings have arcuated shapes within the installation surface.

27. A microscope according to claim 23, wherein said support wings have through holes therein for fixing said frame.

28. A microscope according to claim 27, wherein said through holes are arranged for fixing a remote control box to said frame.

29. A microscope comprising:

an observation optical system having at least an eyepiece unit and an objective lens unit arranged along an optical axis; and a frame for arranging said observation optical system thereon, said frame comprising:

a Y-shaped body which includes:

first and second members arranged to define a space therebetween; and a third member located immediately under the optical axis, said first, second and third members being arranged and interconnected to substantially form said Y-shaped body within an installation surface; and an arm member connected to said Y-shaped body; and a light supply system arranged on said frame in said space defined between said first and second members of said Y-shaped body and said frame.

30. A microscope according to claim 29, wherein said light supply system comprises a transmission light supply device, arranged on said frame, for generating light to be transmitted through a sample.

31. A microscope according to claim 29, wherein said light supply system comprises an incident light supply device, arranged on said frame, for generating light to be incident on a sample.

32. A microscope according to claim 29, wherein said eyepiece unit and said objective lens unit of said observation optical system are mounted on said arm member.

33. A microscope according to claim 29, wherein said eyepiece unit and said objective lens unit of said observation optical system are mounted on said Y-shaped body.

34. A microscope according to claim 29, wherein said light supply system comprises:

a transmission light supply unit for generating light to be transmitted through a sample; and an incident light supply unit for generating light to be incident on the sample.

* * * * *